United States Patent [19]

Krueger

[11] Patent Number: 5,085,928
[45] Date of Patent: Feb. 4, 1992

[54] FIBER REINFORCED COMPOSITES COMPRISING UNI-DIRECTIONAL FIBER LAYERS AND ARAMID SPUNLACED FABRIC LAYERS

[75] Inventor: William H. Krueger, Wilmington, Del.

[73] Assignee: E. I. DuPont de Nemours and Company, Wilmington, Del.

[21] Appl. No.: 334,242

[22] Filed: Apr. 6, 1989

[51] Int. Cl.$^5$ .................. B32B 27/34; B32B 5/12; D04H 00/00; C09J 7/00
[52] U.S. Cl. .................. 428/287; 156/311; 156/313; 428/113; 428/284; 428/286; 428/290; 428/294; 428/297; 428/298; 428/408; 428/902
[58] Field of Search .............. 428/294, 413, 284, 246, 428/280, 282, 198, 113, 286, 290, 297, 298, 408, 902; 264/258; 156/167, 311, 313,

[56] References Cited

U.S. PATENT DOCUMENTS

| | | | |
|---|---|---|---|
| H47 | 4/1986 | Monib | 428/116 |
| 4,421,811 | 12/1983 | Rose et al. | 428/116 |
| 4,485,140 | 11/1984 | Gannett et al. | 428/294 |
| 4,536,438 | 8/1985 | Bishop et al. | 428/246 |
| 4,539,253 | 9/1985 | Hirschbuehler et al. | 428/229 |
| 4,560,603 | 12/1985 | Giacomel | 428/294 |
| 4,604,319 | 8/1986 | Evans et al. | 428/294 |
| 4,770,929 | 9/1988 | Nobumasa et al. | 428/284 |
| 4,868,050 | 9/1989 | Tanaka et al. | 428/413 |
| 4,931,358 | 6/1990 | Wahl et al. | 428/294 |

FOREIGN PATENT DOCUMENTS 178614  11/1985  Netherlands .

OTHER PUBLICATIONS

Research Disclosure Journal No. 13002, HT-2100, "Colardered Spunlaced Nomex Aramid Sheets", Feb. 1975.

*Primary Examiner*—George F. Lesmes
*Assistant Examiner*—James D. Withers

[57] ABSTRACT

A fiber reinforced composite matrix that includes one or more layers of unidirectional fibers alternated with one or more layers of a porous fibrous material, all the fibers being embedded in a thermoplastic resin.

6 Claims, 3 Drawing Sheets

F I G. 1
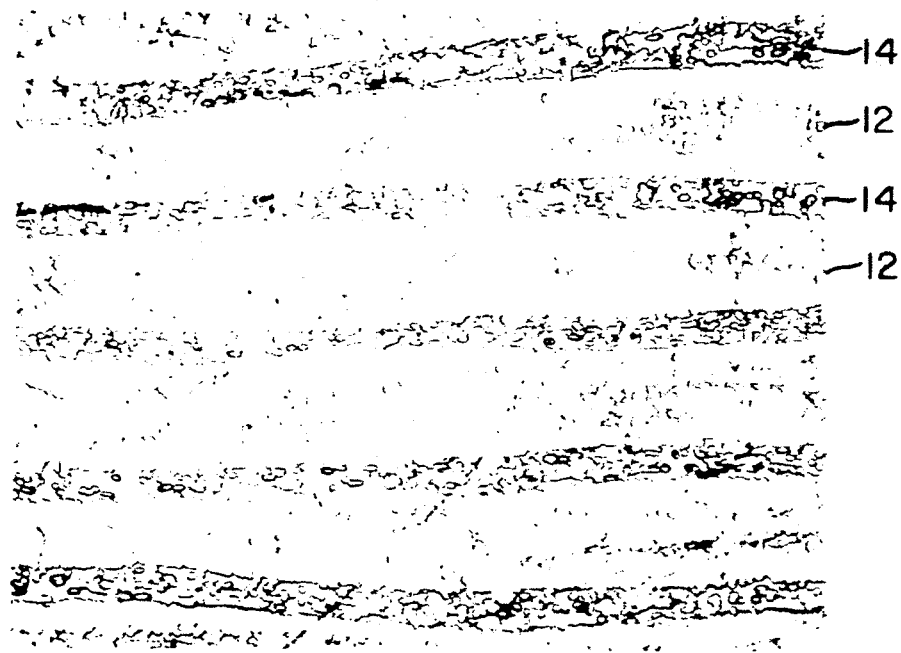
F I G. 2
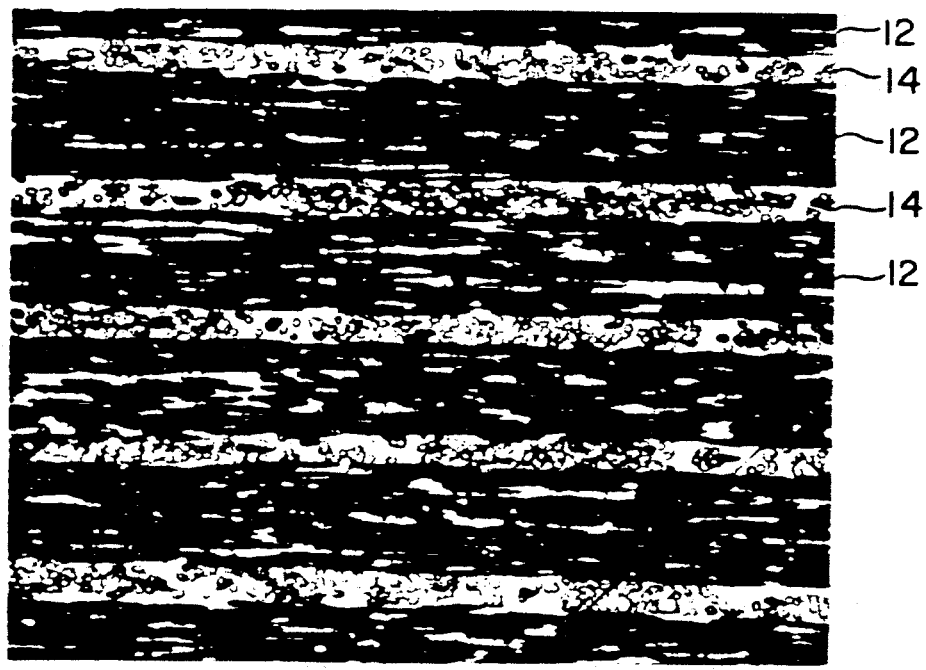

F I G. 4
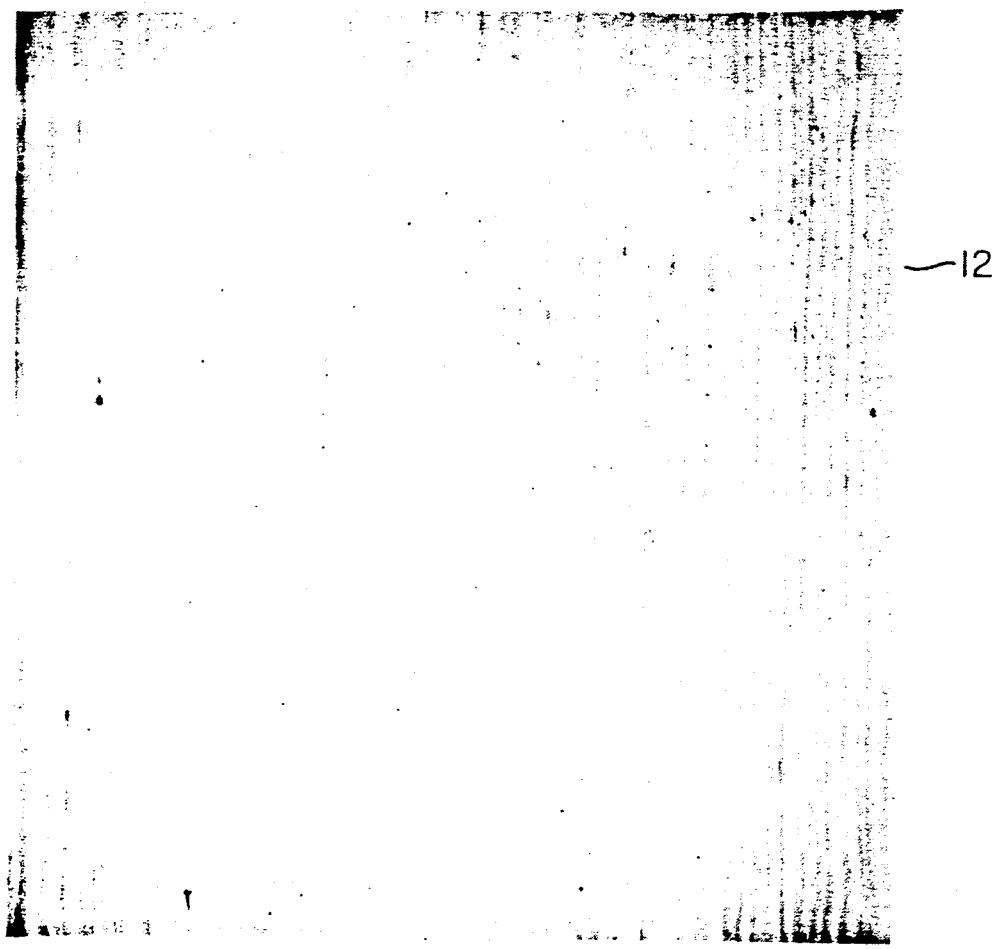

FIBER REINFORCED COMPOSITES COMPRISING UNI-DIRECTIONAL FIBER LAYERS AND ARAMID SPUNLACED FABRIC LAYERS

BACKGROUND OF THE INVENTION

The present invention relates to fiber reinforced composites. More particularly, it relates to alternating layers of fibrous structures all embedded in thermoplastic resin.

Thermosetting resins as well as thermoplastic resins are used in forming fiber reinforced composites.

Thermosetting polymer matrices require a substantial time to harden under heat and pressure and so are not suitable for production of parts at high speeds. The fiber/matrix materials or so-called prepreg materials must be refrigerated to extend their shelf life. Furthermore, incorrectly-formed parts or trimmed excess cannot be recovered and re-used On the other hand, thermoplastic polymer matrices are potentially suitable for high-speed production of parts because they can be preheated to forming temperature and pressed only long enough to consolidate the materials and cool the matrix to a temperature at which the part may be removed from the mold without distorting. In addition, the cost of waste is greatly reduced because incorrectly-formed parts may be re-shaped, and scrap may be recovered and re-used.

However, thermoplastic matrices require dealing with higher temperatures and higher viscosities as compared to composites formed with fiber reinforced thermoset resins. Because of the high temperatures and high viscosities involved, thermoplastic resin composites when subject to compression molding suffer from distortion due to fiber movement and "fiber washing" under pressure This results in non-uniform thickness of the product formed during molding with attendant problems associated with such non-uniformity, such as poor mechanical properties.

SUMMARY OF THE INVENTION

According to the invention a fiber reinforced composite is formed of one or more layers of unidirectional fibers contacting and alternating with one or more layers of porous material, said material having a basis weight of up to about 20% of the continuous layers of unidirectional fibers, said fibers and said material being embedded in a thermoplastic resin, said porous material having a melting point greater than said thermoplastic resin.

The unidirectional fibers and the nonwoven fibers may be any known fibers used in fiber reinforced including carbon, aramid fiber and glass fibers.

Suitable thermoplastic resins include polyesters (including copolyesters), e.g., polyethylene terephthalate, "Kodar" PETG copolyester 6763 (Eastman Kodak); polyamides, e.g., nylon 6,6; polyolefins, e.g., polypropylene; also included are the high temperature resins such as an amorphous polyamide copolymer based upon bis(para-aminocyclohexyl) methane, a semicrystalline polyamide homopolymer also based on bis(para-aminocyclo-hexyl) methane, and polyetheretherketone. Thermosetting resins that are useful include phenolic resins, epoxy resins and vinyl ester resins.

The unidirectional fibers may be of the type described in U.S. Pat. No. 4,640,861 wherein a thermoplastic matrix was reinforced with a unidirectional tow of continuous filament yarns.

Preferably, the porous material may be nonwoven structure made by the general methods disclosed in U.S. Pat. No. 3,508,308, and is a spunlaced nonwoven fabric or batt composed of aramid fibers having a basis weight of from about 0.1 to about 1.0 oz/yd$^2$. Other porous materials such as knit or woven fabrics and paper also will provide the benefits attributable to this invention.

The layers of unidirectional fibers contacting the layers of porous material preferably have a basis weight of from about 0.5 to about 5.0 oz/yd$^2$. The porous materials have a basis weight of up to about 20% of the contiguous layers of unidirectional reinforcing fibers.

BRIEF DESCRIPTION OF THE DRAWINGS

FIGS. 1 and 2 are photographs of polished cross sections of transverse and longitudinal views, both with respect to the unidirectional fibers, of the composite of this invention.

FIG. 4 is a photograph of a composite made according to the invention evidencing a lack of fiber wash as observed in Example 2.

DETAILED DESCRIPTION OF THE PREFERRED EMBODIMENT

Figure 3:
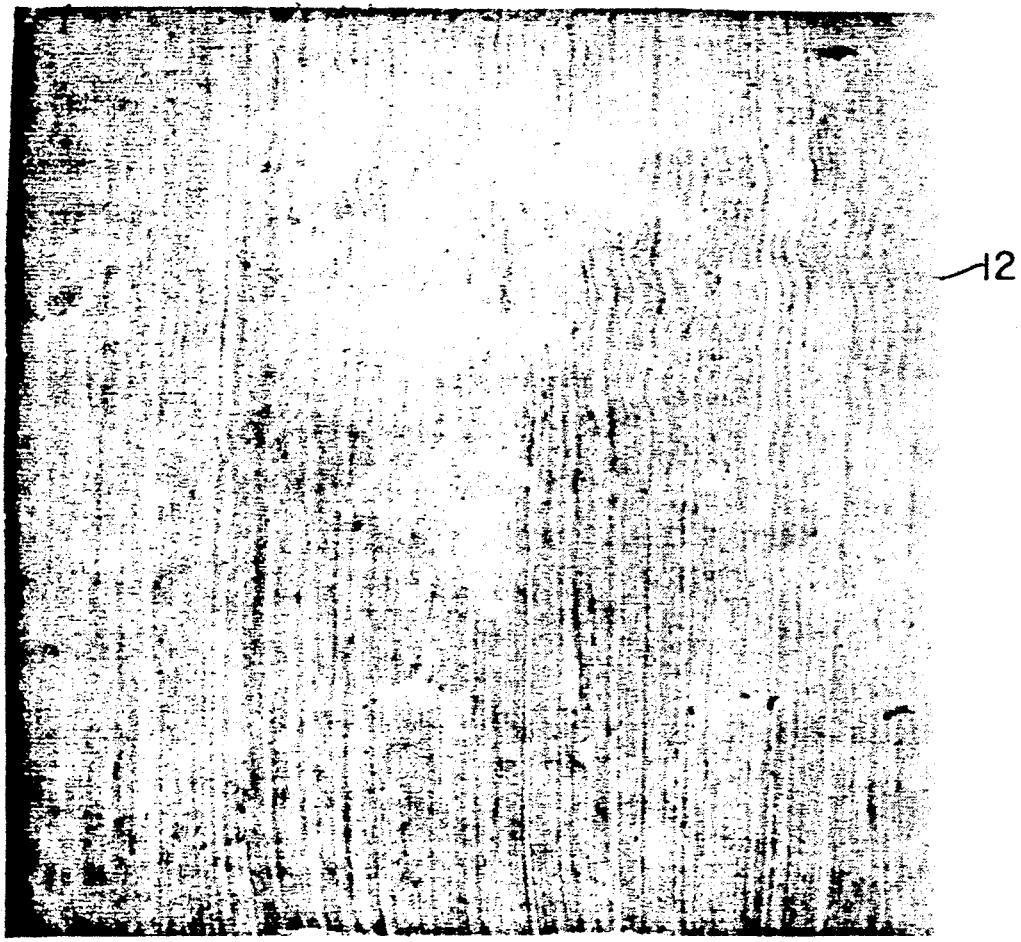
FIG. 3 is a photograph of prior art composites wherein fiber washing has occurred as observed in Example 2.

Referring to FIGS. 1 and 2 an embodiment of the invention chosen for purposes of illustration includes six layers of unidirectional aramid fibers 12 alternated 20 with five layers of spunlaced nonwoven aramid fiber 14. The photographs are at a 60 × magnification level.

EXAMPLE 1

This example compares a series of three laminates containing six plies of unidirectional reinforcement fibers of p-aramid filaments and an amorphous polyamide copolymer thermoplastic resin with three levels (0, 1 and 5) of interlayer additions consisting of 1.0 oz/yd$^2$ basis weight spunlaced aramid fiber.

Fiber reinforced thermoplastic tow material as described in U.S. Pat. No. 4,640,861 consisting of p-aramid filaments (aramid fiber 2300 denier) and thermoplastic amorphous polyamide copolymer based on bis(para-amino-cyclohexyl) methane was prepared into a unidirectional prepreg sheet by frame winding 24 tow ends per inch, followed by hot pressing at 570° F. at 50 psi for 2 min. Partial melting of the thermoplastic matrix resin in adjacent tows resulted in handleable sheet material suitable for composite laminate fabrication.

Six plies of the above unidirectional reinforced sheet containing nominal 65 weight percent (60 volume percent) aramid fiber and 35 weight percent (40 volume percent) resin were stacked with all plies having fiber reinforcement in the same direction into a 9 inch×9 inch flat close tolerance compression mold. This stacking sequence is referred to as Sample A. A second similar stacking sequence containing six plies of unidirectional reinforced sheet was prepared with incorporation of one interlayer of dry low basis weight (1.0 oz/yd$^2$) spunlace aramid fiber between the third and fourth plies. This stacking sequence containing six plies of unidirectional reinforcement and one interlayer is referred to as Sample B. Finally, a third similar stacking sequence containing six plies of unidirectional reinforced sheet was prepared with incorporation of similar spunlaced aramid fiber interlayers between adjacent plies. This stacking sequence containing six plies of unidirectional reinforcement and five interlayers is referred to as Sample C.

The three stacking sequences were consolidated separately to form composite laminates under same molding conditions; place mold containing stacking sequence of plies on hot platen press (pre-set at 600° F.), close press to obtain heating contact, allow mold to heat up to 570° F., increase pressure to 500 psi with 15 min. dwell. Molded laminates were cooled under pressure and removed hot at approximately 320° F.

Nondestructive testing by ultrasonic scanning technique indicated all three laminates were of similar high quality (i.e., low void content) suitable for mechanical testing.

Test bars 6.0 inch in length by 0.500 in width were machined from each laminate in directions parallel to the fiber reinforcement (longitudinal direction) and perpendicular to the fiber reinforcement (transverse direction). Test data on average laminate thickness, longitudinal strength, longitudinal modulus, transverse strength, and transverse modulus are shown in Table 1. Strength and modulus tests for this and other examples are conducted as per ASTM 3039-76.

TABLE 1

| Item | Longitudinal | | Transverse | |
|---|---|---|---|---|
| | Strength (K psi) | Modulus (K psi) | Strength (K psi) | Modulus (K psi) |
| SAMPLE A Six-Ply Prepreg 60 mils thickness | 156.0 | 9,900 | 2.8 | 0.65 |
| SAMPLE B Six-Ply Prepreg plus one interlayer 61 mils thickness | 166.0 | 10,200 | 3.0 | 0.70 |
| SAMPLE C Six-Ply Prepreg plus five interlayers 64 mils thickness | 161.0 | 9,800 | 4.3 | 0.84 |

Examination of polished cross sections of samples from the above laminates at 240 × magnification confirmed that the thermoplastic resin in the unidirectional prepreg readily wet out the spunlace interlayer and resulted in a high quality composite. The addition of the relatively low strength spun lace aramid fiber interlayers significantly improved the thru thickness uniformity of the laminates and hence resulted in more uniform fiber volume control. While significant improvement in both transverse strength and transverse modulus (stiffness) would be expected due to presence of spunlaced interlayers, the surprisingly good retention of longitudinal strength and longitudinal modulus is speculated to be due to more efficient load transfer of the unidirectional reinforcement fibers. The basis weight of the interlayer material to the contiguous layers of reinforcing fibers for Samples B and C was 2 and 12 percent, respectively.

EXAMPLE 2

This example compares two [0°/90°] laminates containing four plies of unidirectional reinforcement fibers of p-aramid filaments and an amorphous polyamide copolymer thermoplastic resin with and without incorporation of 1.0 oz/yd² basis weight spunlace aramid fiber.

Four plies of unidirectional reinforced sheet as described in Example 1 were stacked in sequence with fiber reinforcement direction of 0°/90°/90°/0°, as known in the prior art, into a 7 inch×7 inch flat close tolerance compression mold. The stacking sequence is referred to as Sample D. Similarly, a second stacking sequence of 0°/90°/90°/0° was prepared with incorporation of interlayers of 1.0 oz/yd² spunlaced aramid fiber between adjacent unidirectional reinforcement plies. This stacking sequence containing four reinforcement plies and three spunlace interlayers is referred to as Sample E (FIG. 4).

The two stacking sequences were consolidated separately to form laminates under conditions similar to those described in Example 1. Nondestructive testing by ultrasonic scanning technique indicated the laminates were of similar high quality.

Visual examination of the two laminates revealed that the laminate, Sample E, incorporating the interlayers (FIG. 4) showed substantially better fiber alignment characterized by less "wash" of the unidirectional reinforcement fiber and less local "buckling" of the unidirectional reinforcement fibers than the Sample D (FIG. 3). It is speculated that the interlayer additions buffered the polymer flow during the molding step and hence minimized fiber "wash" and supported the continuous fibers during the cooling step and hence minimized fiber buckling due to thermal mismatch between fibers and resin. Measurement of thru thickness variation of the two laminates indicated variation of 0.033 inches to 0.046 inches for Sample D and much smaller variation of 0.035 inches to 0.039 inches for Sample E. The closer molding tolerance for Sample E translates into much closer fiber volume loading in the final laminate part and would be expected to lead to better uniformity in mechanical properties. The basis weight of the interlayer to the contiguous layers of reinforcing fibers for Sample E was 10.7 percent.

EXAMPLE 3

This example compares two laminates containing thirteen plies of unidirectional reinforcement fibers of p-aramid filaments and an amorphous polyamide copolymer thermoplastic resin with and without incorporation of 1.0 oz/yd² basis weight spunlace aramid fiber.

Thirteen plies of unidirectional reinforced prepreg as described in Example 1 containing 65 weight percent (60 volume percent) aramid fiber and 35 weight percent (40 volume percent) resin were stacked with all plies having fiber reinforcement in the same direction into a 7 inch×7 inch flat close tolerance compression mold. This stacking sequence is referred to as Sample F. A second similar stacking sequence containing thirteen plies of unidirectional reinforced prepreg was prepared with incorporation of one interlayer between adjacent plies. This stacking sequence containing thirteen plies of unidirectional reinforcement and twelve interlayers is referred to as Sample G.

The two stacking sequences were consolidated separately to form laminates under conditions similar to those described in Example 1. Nondestructive testing by ultrasonic scanning technique indicated the laminates were of similar high quality and suitable for mechanical testing.

Test bars were machined from each laminate in directions parallel to the fiber reinforcement (longitudinal direction) and perpendicular to the fiber reinforcement (transverse direction). Flex and Interlaminar Shear Tests were performed:

ASTM D 790 using a span/depth ratio of 16/1.

ASTM D2344 using a span/depth ratio of 4/1 for interlaminar shear.

Test data on average laminate thickness, longitudinal flexural strength, longitudinal flexural modulus, longitudinal interlaminar shear, transverse flexural strength, transverse flexural modulus, and transverse interlaminar shear are shown in Table 3.

TABLE 3

|  | Flexural | | Interlaminar |
|---|---|---|---|
|  | Strength (K psi) | Modulus (K psi) | Shear (K psi) |
| LONGITUDINAL | | | |
| Sample F (no interlayers) | 98.9 | 9,700 | 7.4 |
| Sample G (with interlayers) | 97.6 | 9,900 | 6.5 |
| TRANSVERSE | | | |
| Sample F (no interlayers) | 2.7 | 530 | 0.53 |
| Sample G (with interlayers) | 6.7 | 580 | 1.10 |

Average Thickness of Sample F: 122 mils (116 to 129 variation)
Average Thickness of Sample G: 131 mils (130 to 132 variation)

Addition of low basis weight interlayers to unidirectional reinforcement plies show substantial improvement in transverse flexural strength and interlaminar shear, with surprisingly little or no loss in longitudinal properties. Addition of interlayers resulted in more uniform thru thickness of the consolidated laminates. The basis weight of the interlayer material to the contiguous reinforcing fibers was 13.1 percent for Sample G.

EXAMPLE 4

This example compares three laminates containing six plies of unidirectional reinforcement fibers of p-aramid filaments and an amorphous polyamide copolymer thermoplastic resin with and without incorporation of 1.53 oz/yd² basis weight aramid fiber paper.

Six plies of unidirectional reinforced prepreg as described in Example 1 containing 65 weight percent (60 volume percent) aramid fiber and 35 weight percent (40 volume percent) thermoplastic resin were stacked with all plies having fiber reinforcement in the same direction into a 7 inch×7 inch flat close tolerance compression mold. This stacking sequence is referred to as Sample H A second similar stacking sequence containing six plies of unidirectional reinforced prepreg was prepared with incorporation of interlayers consisting of 1.53 oz/yd² aramid fiber paper with machine direction parallel to unidirectional fibers between adjacent plies. This stacking sequence containing six unidirectional plies and five interlayers of paper with machine direction in same orientation as unidirectional fibers is referred to as Sample I. Finally, a third similar stacking sequence containing six plies of unidirectional reinforced prepreg was prepared with incorporation of interlayers consisting of 1.53 oz/yd² aramid fiber paper with machine direction perpendicular to unidirectional fibers between adjacent plies. This stacking sequence containing six unidirectional plies and five interlayers of paper with machine direction at right angles to the unidirectional fibers is referred to as Sample J.

The three stacking sequences were consolidated separately in the compression mold to form laminates under conditions similar to those described in Example 1.

Nondestructive testing by ultrasonic scanning technique indicated all three laminates were of similar high quality suitable for mechanical testing.

Tensile test bars were machined from each laminate in directions parallel to the unidirectional fiber reinforcement (longitudinal direction) and perpendicular, that is right angle, to the fiber reinforcement (transverse direction). Test data on average laminate thickness, longitudinal tensile strength, longitudinal modulus (stiffness), transverse strength, and transverse modulus are shown in Table 4.

TABLE 4

|  | Longitudinal | | Transverse | |
|---|---|---|---|---|
| Item | Strength (K psi) | Modulus (K psi) | Strength (K psi) | Modulus (K psi) |
| SAMPLE H Six plies Prepreg Avg. thickness: 0.058 in. | 149.6 | 11,000 | 2.4 | 0.79 |
| SAMPLE I Six plies with interlayers MD parallel to ply fibers Avg. thickness: 0.065 in. | 152.5 | 10,000 | 3.9 | 1.11 |
| SAMPLE J Six plies with five interlayers MD perpendicular to ply fibers Avg. thickness: 0.065 in. | 133.3 | 10,900 | 3.8 | 1.13 |

Comparison of test results of Sample I as compared to Sample J suggests that interlayers consisting of aramid fiber paper with MD parallel to continuous reinforcement plies is comparable or superior in some property benefits as interlayers consisting of aramid fiber paper MD perpendicular to continuous reinforcement. The surprising result is that little or no trade-off in longitudinal properties occurs while achieving approximately 60% improvement in transverse tensile strength and 40% improvement in transverse modulus. A continuous process for combining unidirectional fiber prepreg in roll form with low basis weight paper of aramid fiber in roll form with machine direction of nonwoven parallel to unidirectional fiber is suggested. Such hybrid materials offering greater strength and rigidity would lend themselves more readily for article manufacture by automated equipment as high speed thermoplastic tape laydown. The basis weight for the interlayer material to contiguous layers of reinforcing fibers for Samples I and J was 18.2 percent.

EXAMPLE 5

This example compares two laminates containing five plies of unidirectional prepreg of graphite fibers (Magnamite graphite fiber Type AS4, a high-strength PAN-based fiber produced by Hercules Incorporated) and an amorphous polyamide copolymer thermoplastic resin with and without incorporation of 0.8 oz/yd² basis weight spunlaced aramid fiber.

Fiber reinforced tow material as described in U.S. Pat. No. 4,640,861 consisting of graphite fibers (3000 filaments) and thermoplastic amorphous polyamide copolymer based on bis(para-aminocyclohexyl) methane was prepared into a unidirectional prepreg sheet by frame winding 18 tow ends per inch, followed by hot pressing at 570° F. at 50 psi for 2 min. Partial melting of the thermoplastic matrix resin in adjacent tows resulted in handleable sheet material suitable for composite laminate fabrication.

Five plies of the above unidirectional reinforced sheet containing 61 weight percent (50 volume percent) graphite fiber and 39 weight percent (50 volume percent) resin were stacked with all plies having fiber reinforcement in the same direction into a 7 inch×7 inch flat close tolerance compression mold. This stacking sequence is referred to as Sample K. A second similar stacking sequence containing five plies of unidirectional reinforced sheet was prepared with incorporation of interlayers consisting of dry 0.80 oz/yd$^2$ spunlaced aramid fibers between adjacent unidirectional reinforcement plies. This stacking sequence containing five reinforcement plies and four spunlace interlayers is referred to as Sample L.

The two stacking sequences were consolidated separately to form laminates under same molding conditions; place mold containing stacking sequence of plies on hot platen press (pre-set at 600° F.), close press to obtain heating contact, allow mold to heat up to 570° F., increase pressure to 500 psi with 15 min. dwell. Molded laminates were cooled under pressure and removed from the mold at approximately 90° F.

Nondestructive testing by ultrasonic scanning technique indicated both laminates were of similar high quality (i.e., low void content) suitable for mechanical testing.

Tensile test bars were machined from each laminate in directions parallel to the graphite fibers (longitudinal direction) and perpendicular to the graphite fibers (transverse dirction). Test data on average laminate thickness, longitudinal strength, longitudinal modulus, transverse strength, and transverse modulus are shown in Table 5.

TABLE 5

| | Longitudinal | | Transverse | |
|---|---|---|---|---|
| Item | Strength (K psi) | Modulus (K psi) | Strength (K psi) | Modulus (K psi) |
| SAMPLE K Five plies Prepreg Avg. thickness: 0.032 in. | 201.6 | 18,100 | 1.5 | 900 |
| SAMPLE L Five plies with four interlayers Avg. thickness: 0.37 in. | 195.5 | 15,900 | 6.8 | 1,600 |

Comparison of Sample K with Sample L shows the result that addition of relatively very low strength spunlaced aramid fiber interlayers results in surprisingly very little trade-off in longitudinal direction strength of the laminate while significantly increasing both transverse direction strength and modulus. Somewhat lower modulus in the longitudinal direction of Sample L would be expected due to the substantial difference in moduli of the graphite and aramid fiber. Visual examination of the two laminates prior to machining test bars revealed that the laminates incorporating the interlayers showed better fiber alignment characterized by less "wash" of the unidirectional fibers and more uniformity in the thru thickness molded dimension. While this observation in the graphite laminates is apparent in close scrutiny, it is not as readily obvious as the "wash" phenomena in an all aramid fiber laminate such as Example 2 because the blackness of the graphite fibers makes it more difficult to observe fiber misorientation. It is speculated that the incorporation of the spunlace interlayers of aramid fiber mechanically hold the graphite fibers in desired place and buffer the flow of the high viscosity resin during the compression molding cycle. The basis weight of interlayer material to contiguous reinforcing material for Sample L was 13.8 percent.

EXAMPLE 6

This example demonstrates a thermoplastic hydrid prepreg material consisting of continuous unidirectional reinforcement fibers of p-aramid and 0.55 oz/yd$^2$ spunlaced aramid paper—30% aramid fiber nonwoven and an amorphous polyamide copolymer thermoplastic resin.

Fiber reinforced thermoplastic tow material as described in Example 1 containing 65 weight percent aramid fiber and 35 percent amorphous polyamide copolymer based on bis(para-aminocyclohexyl) methane was incorporated into a hybrid thermoplastic prepreg sheet by frame winding 12 tow ends per inch onto a dry layer of 0.55 oz/yd$^2$ spunlaced nonwoven aramid paper—30% aramid fiber, followed by hot pressing at 560° F. at approximately 50 psi for 2 min. Partial melting of the thermoplastic matrix resin in adjacent tows and partial polymer flow into the spunlaced material produced a lightweight, thin, durable hybrid reinforced sheet that could be readily handled for thermoplastic composite fabrication. Without the addition of the spunlaced layer to substantially increase the strength of the prepreg in the transverse direction, the above material could not be handled without splitting along the unidirectional fiber reinforcement direction.

Twelve plies of the above hybrid prepreg were stacked with all plies having continuous fiber reinforcement in the same direction into a 9 inch×9 inch flat close tolerance compression mold.

The stacking sequence was consolidated under conditions similar to that described in Example 1. Nondestructive testing by ultrasonic technique indicated a high quality laminate was prepared. This laminate is referred to as Sample M. Test bars were machined from the laminate in direction parallel to the unidirectional fiber reinforcement (longitudinal direction). Test data on average laminate strength and modulus of Sample M is shown in Table 6.

TABLE 6

| Item | Longitudinal Strength (K psi) | Longitudinal Modulus (K psi) |
|---|---|---|
| SAMPLE M 12 plies hybrid prepreg | 170.1 | 10,775 |

Thru thickness measurements of the above laminate indicated that the average thickness of the hydrid lamina plies was 0.005 mils. The ability to reduce ply thickness is desired for both flexibility in ply layup design and performance because laminates containing thinner ply thickness are characterized as having better crack propagation resistance. The addition of the spunlaced nonwoven to form a high performance hybrid prepreg allows preparation of more durable material less prone to splitting along continuous fiber reinforcement direction during hand fabrication procedures and offers further benefit in improvement transverse strength and delamination resistance. The basis weight of interlayer material to contiguous layers of reinforcing fibers for Sample M was 15.7 percent.

EXAMPLE 7

This example compares a series of four laminates containing prepreg plies of unidirectional reinforcement fibers of p-aramid filaments and amorphous polyamide copolymer thermoplastic resin with and without benefit of 0.8 oz/yd$^2$ spunlaced aramid fiber interlayers. Prior to molding, plies were thoroughly dried to enhance level of adhesion bonding between matrix resin and reinforcing materials (unidirectional and spunlaced filaments).

Unidirectional prepreg sheets as described in Example 1 containing 65 weight percent (60 volume percent) aramid fiber and 35 weight percent (40 volume percent) resin were stacked with all plies having fiber reinforcement in the same direction into a 9 inch×9 inch flat close tolerance compression mold. A total of four stacking sequences were examined. A first stacking sequence containing 6 plies is referred to as Sample N. A similar stacking sequence contained 6 plies with 0.8 oz/yd$^2$ spunlaced aramid fiber between adjacent plies. This second stacking sequence containing 6 plies of unidirectional reinforcement plies and five interlayers is referred to as Sample O The third stacking sequence contained eight plies and is referred to as Sample P. The fourth stacking sequence contained eight plies of unidirectional reinforcement with 0.8 oz/yd$^2$ spunlaced aramid fiber between adjacent plies. This last stacking sequence containing eight plies of unidirectional reinforcement and seven interlayers is referred to as Sample Q.

The four stacking sequences were consolidated separately to form composite laminates under same pre-drying and molding conditions; dry 4 hrs. under vacuum at 150° C. (300° F.) in mold, place mold containing stacking sequence of plies on hot platen press (pre-set at 600° F.), close press to obtain heating contact; allow mold to heat up to 570° F., increase pressure to 300 psi with 15 min. dwell. Molded laminates were cooled under pressure and removed hot at approximately 320° F.

Nondestructive testing by ultrasonic scanning technique indicated all four laminates were of similar high quality (i.e., low void content) suitable for mechanical testing.

Samples N and O were molded for mechanical testing in the unidirectional fiber direction (longitudinal direction) and consisted of only six plies to assure that breaking loads would not cause pull-out from testing tabs adhesively bonded to test bars. Samples P and Q were molded for mechanical testing in the direction perpendicular to the unidirectional fiber direction (transverse direction) and consisted of eight plies to assure that these relatively lower strength samples would have sufficient strength for both machining and accurate testing.

Test bars 6.0 inch in length by 0.500 inch in width were machined from Samples N and O. Test bars 8.750 inches in length by 1.000 inch in width were machined from Samples P and Q. Test data on average laminate thickness, longitudinal strength, longitudinal modulus, transverse strength and transverse modulus are shown in Table 7.

TABLE 7

| | Longitudinal | | Transverse | |
|---|---|---|---|---|
| Item | Strength (K psi) | Modulus (K psi) | Strength (K psi) | Modulus (K psi) |
| SAMPLE N Six-ply Prepreg 0.054 in. thickness | 189.3 | 12,750 | — | — |
| SAMPLE O Six-ply Prepreg with interlayers 0.055 in. thickness | 188.8 | 11,510 | — | — |
| SAMPLE P Eight-ply Prepreg 0.073 in. thickness | — | — | 3.62 | 800 |
| SAMPLE Q Eight-ply Prepreg with interlayers 0.073 in. thickness | — | — | 4.75 | 870 |

The surprising result in these tests in which all stacking sequences were dried prior to molding is that 31% improvement in transverse strength and 9% improvement in transverse modulus was achieved with no loss in longitudinal strength and only a minor 10% loss in longitudinal modulus. Comparison of test data shown in Example 7 with that shown in Example 1 shows that addition of interlayers to unidirectional reinforcement prepreg allows achievement of high transverse properties in molded parts without the added step of pre-drying material prior to molding. The basis weight for interlayer material to contiguous layers of reinforcing material for Samples O and Q was 9.5 and 10 percent, respectively.

Example 8

This example compares a pair of laminates containing ordered staple carbon fiber (AS-4) and an amorphous polyamide copolymer thermoplastic resin with and without incorporation of low basis weight spunlace nonwoven aramid fiber interlayers.

Eight plies of ordered staple unidirectional carbon fiber reinforced amorphous polyamide copolymer thermoplastic prepreg based on bis(para-aminocyclohexyl) methane was stacked with all sheets having fiber reinforcement in same direction into a 9 inch×9 inch flat close tolerance compression mold. This configuration is referred to as Sample R. Similarly another stacking configuration containing eight plies of ordered carbon fiber staple prepreg was prepared with incorporation of dry 0.55 oz/yd$^2$ basis weight spunlaced nonwoven aramid fiber interlayers between pairs of unidirectional plies. This configuration containing eight unidirectional plies and three interlayer additions is referred to as Sample S.

Laminate molding conditions for R and Sample S are the same; place mold containing plies on hot platen press pre-set at 600° F. (300° C.), close press to obtain heating contact, allow mold to heat to 580° F. and increase pressure to 300 psi with 15 min. dwell. Laminates were cooled under pressure and removed hot at approximately 320° F.

Test bars 6.0 inches length by 0.50 inch width were machined from each laminate. Data on average laminate thickness, tensile strength, tensile modulus, and strain-to-failure are shown in Table 8.

TABLE 8

| Item | Thickness (inches) | Tensile Strength (K psi) | Tensile Modulus (K psi) | Strain-to-Failure (Percent) |
|---|---|---|---|---|
| SAMPLE R | 0.039 | 236.0 | 16,700 | 1.24 |

TABLE 8-continued

| Item | Thickness (inches) | Tensile Srength (K psi) | Tensile Modulus (K psi) | Strain-to-Failure (Percent) |
| --- | --- | --- | --- | --- |
| no interlayers | | | | |
| SAMPLE S 0.55 oz/yd² nonwoven | 0.042 | 217.0 | 16,600 | 1.20 |

The basis weight of the interlayer material to contiguous layers of reinforcing material for Sample S was 5.4 percent.

I claim:

1. A fiber reinforced composite comprising one or more layers of unidirectional fibers contacting and alternating with one or more layers of a porous aramid spunlaced fibrous material, said aramid spunlaced fibrous material having a basis weight of up to about 20 percent of the continuous layers of unidirectional fibers, said fibers and said aramid spunlaced fibrous material being embedded in a thermoplastic resin, said porous aramid spunlaced fibrous material having a melting point greater than said thermoplastic resin.

2. The composite of claim 1, wherein said unidirectional fibers are aramid fibers.

3. The composite of claim 1, wherein said unidirectional fibers are carbon fibers.

4. The composite of claim 2, wherein said porous aramid spunlaced fibrous material has a basis weight in the range of from about 0.1 to about 1.0 oz/yd², said contiguous layer having a basis weight of from about 0.5 to about 5 oz/yd².

5. The composite of claims 1, 2, 3 or 4 wherein said layers of porous aramid spunlaced fibrous material are coextensive with said layers of unidirectional fibers.

6. In a process for preparing an article from fiber reinforced plastic that includes the steps of assembling a plurality of layers of said fiber reinforced plastic, heating said layers to a predetermined temperature above the melting point of the plastic and pressing said layers to form said article, the improvement comprising: the step of adding at least one coextensive layer of porous aramid spunlaced fibrous material having a melting point greater than the plastic between the layers of the fiber reinforced plastic prior to said heating and pressing steps to stabilize the fiber contained in said fiber reinforced plastic layer.

* * * * *